July 21, 1964   F. N. PLATT   3,141,655
ENERGY ABSORBING DEVICE
Filed Dec. 5, 1961   2 Sheets-Sheet 1
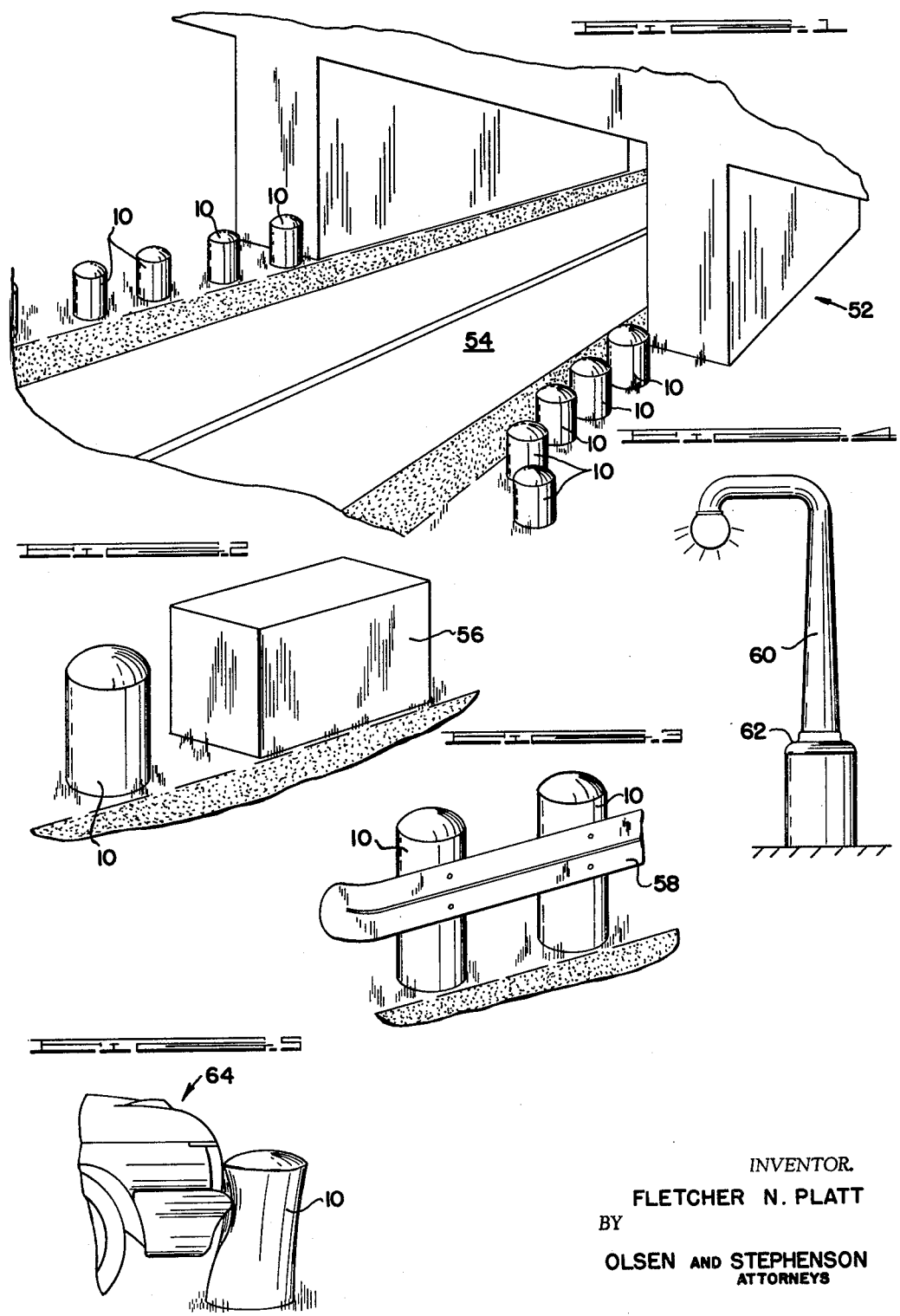
INVENTOR.
FLETCHER N. PLATT
BY
OLSEN AND STEPHENSON
ATTORNEYS July 21, 1964     F. N. PLATT     3,141,655
ENERGY ABSORBING DEVICE
Filed Dec. 5, 1961     2 Sheets-Sheet 2
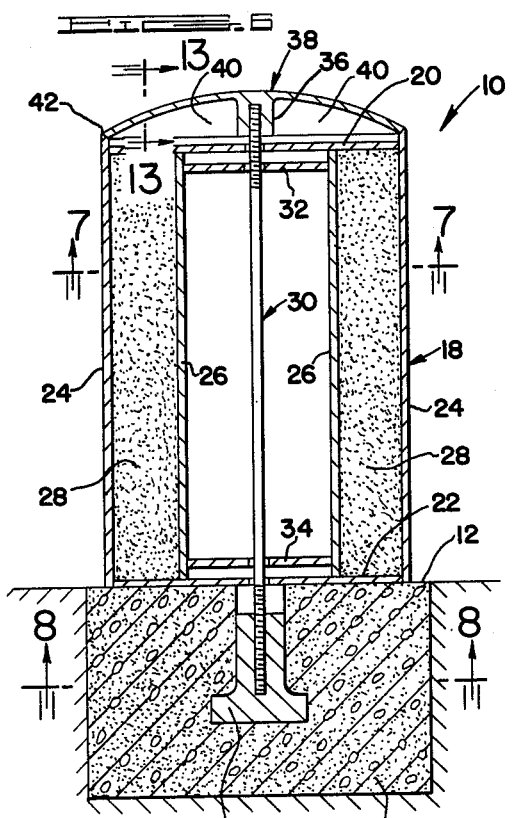
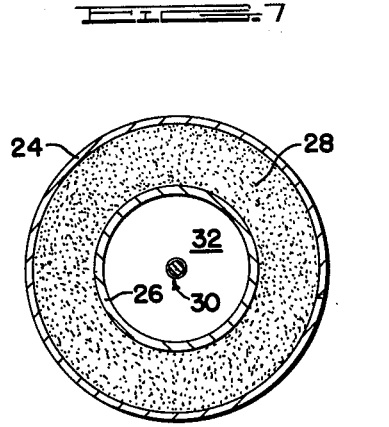
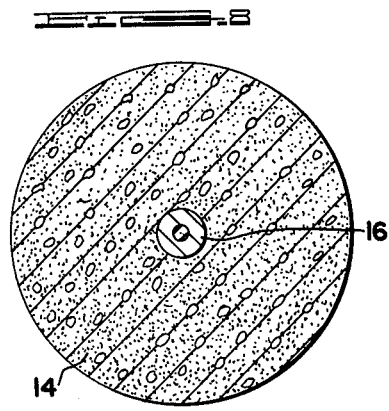
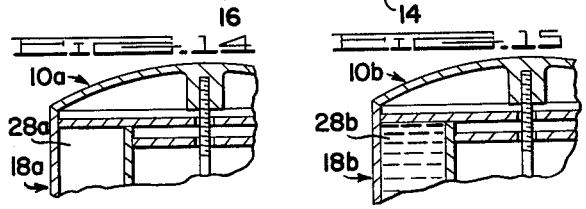
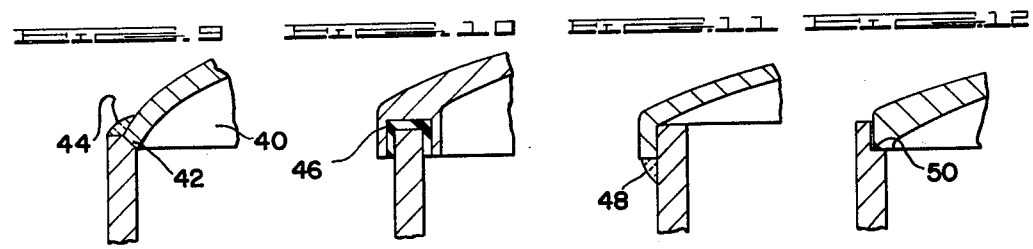
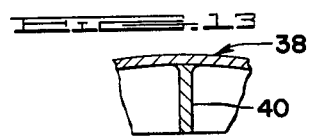
INVENTOR.
FLETCHER N. PLATT
BY
OLSEN AND STEPHENSON
ATTORNEYS

United States Patent Office 3,141,655
Patented July 21, 1964

3,141,655
ENERGY ABSORBING DEVICE
Fletcher N. Platt, 510 Huntington Drive,
Ann Arbor, Mich.
Filed Dec. 5, 1961, Ser. No. 157,153
10 Claims. (Cl. 256—1)

The present invention relates to an energy absorbing device adapted to be used in conjunction with rigid objects which are located sufficiently close to a highway so that they constitute hazards which may be struck by a rapidly moving vehicle.

Many serious and fatal traffic accidents result from moving vehicles striking rigid, immovable structures, trees or other natural hazards along the highway right-of-way. In such instances where an immovable object is encountered, practically the entire energy of impact is absorbed by collapse of the vehicle structure. As a general rule, structural objects located along a highway are designed without consideration for their energy absorbing characteristics, but rather are designed to minimize damage to the object itself.

Guard rails and guard cables have been used for many years to reduce the chance of vehicles going over embankments. They are also being used today as median dividers and to guard abutments, utility poles and traffic sign standards in some locations. However, guard rails are not used in many places because of expense of installation, maintenance and replacement. Furthermore, such guard rails function primarily to accommodate sideswiping action of a vehicle, and they are not designed to act as energy absorbing devices in a direct or head-on collision. In this respect, guard rail supports are not properly designed to absorb energy and thus are dangerous when directly impacted.

It is an object of the present invention to provide an improved guard device for location adjacent a rigid object along a highway right-of-way, which device is constructed and arranged to absorb energy so that at least a portion of the kinetic energy of a striking vehicle is dissipated in engaging the device and is not available to deform the vehicle or to cause injury to the occupants of the vehicle should the vehicle encounter the guarded rigid object.

It is another object of the present invention to provide an improved guard device of the foregoing character which is constructed and arranged to absorb energy by permanent deformation as distinguished from a device which has spring characteristics which stores energy and returns it to the impacting object. In this respect it is important to recognize the difference between these two devices. For maximum protection, an energy absorbing device is desirable, because the energy return is negligible, while the energy return from a spring device may cause further damage in addition to the damage resulting from the initial impact. In the case of a vehicle striking an object along the road, a spring device also may project the vehicle out into the traffic again or propel it in some other undesirable direction. On the other hand, an energy absorbing device can stop a vehicle with a minimum of rebound, and further reduce the chances of serious damage.

It is still another object of the present invention to provide a guard device of the foregoing character which has a relatively low initial cost, and further, which is constructed and arranged so that in the event it is deformed it can easily and readily be replaced at relatively low cost by another unit of the same design.

Other objects of this invention will appear in the following description and appended claims, reference being had to the accompanying drawings forming a part of this specification wherein like reference characters designate corresponding parts in the several views.

In the drawings:

FIGURE 1 is a fragmentary perspective view of a highway showing a plurality of energy absorbing devices embodying the present invention arranged before rigid abutments;

FIGURE 2 is another fragmentary perspective view drawn to an enlarged scale showing an embodiment of the present invention positioned before a single abutment;

FIGURE 3 is a fragmentary perspective view showing embodiments of the present invention used as guard rail supports;

FIGURE 4 is a perspective view of a street lamp post having a modified form of the present invention forming a part of its base;

FIGURE 5 is a fragmentary view of the forward end of a motor vehicle and one of the embodiments of the invention shown in FIGURES 1-3 after engagement of the embodiment by the motor vehicle;

FIGURE 6 is an enlarged vertical section of the embodiment shown in FIGURES 1-3 and 5;

FIGURE 7 is a section taken on the line 7—7 of FIGURE 6;

FIGURE 8 is a section taken on the line 8—8 of FIGURE 6;

FIGURE 9 is an enlarged fragmentary section showing a detail of construction of the top portion of the embodiment shown in FIGURE 6;

FIGURE 10 is a modified form of the detail of construction shown in FIGURE 9;

FIGURE 11 is another modified form of the detail of construction shown in FIGURE 9;

FIGURE 12 is still another modified form of the detail of construction shown in FIGURE 9;

FIGURE 13 is an enlarged fragmentary section taken on the line 13—13 of FIGURE 6;

FIGURE 14 is a fragmentary section of a modification of the embodiment shown in FIGURE 6 showing a different fluid within the container; and FIGURE 15 is a fragmentary section of still another modification showing still another fluid in the container of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The energy absorbing device 10 is adapted to be mounted on a surface 12 (FIGURE 6) which is substantially flush with the surrounding ground. For the purpose of mounting the energy absorbing device 10, a concrete base 14 can be poured in the ground and an anchoring device 16 can be embedded therein.

The illustrated embodiment of the energy absorbing device 10 includes a generally annular container 18 which is closed at its opposite ends by suitably connected disks 20 and 22, and its outer and inner surfaces are defined by its outer and inner shells or cylindrical walls 24 and 26. The interior of the container 18 is filled with fluid material, and in the illustrated embodiment sand 28 is thus employed. One of the properties which the sand or fluid material 28 should possess is that it be able to transmit force in all directions, such as is the case with a hydraulic fluid. Depending upon the characteristics required of a particular energy absorbing device, such fluid materials as sand, gravel, plastics or liquids may be used. Thus, by way of example as shown in FIGURES 14 and 15, the energy absorbing devices 10a and 10b have containers 18a and 18b which are filled respectively with a gas 28a and a liquid 28b.

Extending coaxially through the opening defined by the inner wall 26 is a tension member or rod 30 which is threadedly connected at its lower end to the anchoring device 16. In the illustrated embodiment the tension member is in the form of the rigid rod 30, but under appropriate circumstances the tension member may take the form of a kinked or coiled rod and in some instances it may be a cable, or the like. The tension member or rod 30 extends through two centrally apertured tranverse disks 32 and 34 which are suitably connected to the inner wall 26. The upper end of rod 30 is threadedly connected to the central hub 36 of a cap member 38. The latter has a disk for its upper surface reinforced by ribs 40 (FIGURES 6 and 13) radiating from the central hub 36 to the outer peripheral edge 42 thereof. The ribs 40 serve to rigidify the top portion of the energy absorbing device 10 and to oppose collapsing of the cap member 38 in an axially inward direction of the container 18, should the energy absorbing device 10 be struck in such a manner as to place the rod 30 in tension.

The outer peripheral edge 42 may be joined to the top edge of the outer wall 24 by any of a series of suitable joints shown in FIGURES 9, 10, 11 and 12. As shown in FIGURE 9, the joint is effected by welding the joint at 44. FIGURE 10 shows a sealed joint at 46. FIGURE 11 illustrates a welded joint at 48, and FIGURE 12 shows a machined shoulder 50 into which the cap member 52 is formed to fit. Thus, it can be seen that when mounting the energy absorbing device 10 in place on a base portion 14, the device 10 can initially be made as a complete unit and can be turned on the rod 30 in the anchoring device 16 until the lower threaded portion of rod 30 draws the container 18 snugly against the surface 12. Under these circumstances the cap member 38 normally will be welded in place in the manner shown in FIGURES 9 and 11. However, it may be desirable to assemble the prefabricated parts at the place of installation and for such needs, either of the joints shown in FIGURES 10 and 12 may be used.

From the foregoing description it can be understood that the energy absorbing device 10 can be made as a relatively low cost item which can readily be replaced by a similar device in the event the device 10 is deformed after contact has been made by an automobile, or the like. Different materials for the anchor rod 30, the outer and inner shells 24 and 26, the cap 38 may be used, such as metal, plastic, wood or any combination. The selection of such materials will influence the energy absorbing and structural characteristics of the device, and such selections can be made in accordance with particular needs.

The energy absorbing and structural characteristics can also be varied by modifying the materials of the inner shell 26 or even perforating it to vary the conditions of release of the sand or fluid material 28 from the container 18 upon impact by a moving object such as an automobile. Likewise, changing the dimensions of the outer and inner shells 24 and 26, anchor rod 30, height of the unit and thickness of material used will vary structural and impact characteristics. Still further, modifying the type and size of stiffeners or transverse members 32 and 34 and/or fluid material 28 will modify the energy absorption at higher velocities of impact. Also, the space within the inner shell 26 may also be partially or totally filled with a fluid material to modify the energy absorbing properties of the present invention.

In normal usage, the energy absorbing devices 10 can be positioned in series before rigid abutments, such as those forming a part of the overpass 52 shown in FIGURE 1. When positioned in series in this manner, the devices 10 will function to absorb energy successively from a vehicle which has left the road 54 and is proceeding on a collision course such that it will encounter the abutments of overpass 52. Thus, the devices 10 will progressively reduce the kinetic energy of the vehicle and will prevent impact with the abutments, or will substantially reduce the impact with such abutments should all the devices be collapsed.

Energy absorbing devices 10 can be used in other arrangements. Thus, a single unit can be placed before an abutment 56 as shown in FIGURE 2. Also, a series of the energy absorbing devices 10 can be used to support a guard rail 58, as shown in FIGURE 3.

The energy absorbing device 10 can also be modified so that the rod 30 is replaced by the central supporting rod of a lamp 60, as shown in FIGURE 4. In this arrangement a modified cap member 62 is also required.

When the energy absorbing device 10 is struck by a moving vehicle it will function generally the same in any of the environments shown in FIGURES 1 to 4.

Assuming the device 10 is subjected to a low or medium velocity impact by a vehicle 64, it normally will deform such as is shown in FIGURE 5, and will remain anchored to its base. Under these circumstances, the anchor rod 30 will absorb energy by opposing such bending forces as will occur, and also it will attempt to withstand the forces that place it in tension upon bending of the device 10. However, the energy is absorbed primarily by deformation of the container 18 and displacement of the fluid material or sand 28. Upon impact, the outer and inner shells 24 and 26 will deform. Energy will be absorbed by compression of the fluid material 28 between these shells and will cause further deformation thereof. At high impact speeds the energy will be absorbed also by failure in bending of the cap member 38, and the ribs 40 installed therein to enable the cap member to withstand maximum forces tending to collapse it. When impacts of this magnitude occur, the inner shell 26 may also collapse absorbing energy by its collapse and by displacement of the fluid material 28.

Thus, it can be understood from the foregoing description that the energy absorbing device comprising the present invention is constructed and arranged so that its various components can absorb energy on being deformed. These components are designed so that they will effect maximum absorption of the energy of impact while causing minimum damage to the striking vehicle. The design is such that, under impact, there is little chance for parts to be thrown free which could cause injury to pedestrians or occupants of other vehicles. The device is also readily replaceable at a minimum of cost and effort if damaged.

I claim:

1. An energy absorbing device for dissipating by deformation upon impact at least a portion of the kinetic energy of a moving vehicle traveling over a surface comprising in combination:
   (a) an upright normally closed container having cylindrical outer and inner deformable walls, the diameter of said inner deformable wall being sufficient to permit substantial inward deformation thereof,
   (b) a cap connected to the upper end of the outer deformable wall,
   (c) a central anchor member connected to said cap to prevent axial displacement of the cap therefrom and extending into said surface and adapted to hold said container against said surface, and
   (d) fluid material filling the container between the cylindrical outer and inner deformable walls for absorbing energy of impact of a moving vehicle, said material being capable of transmitting forces generally in all directions so that the energy absorbed thereby is most effectively dissipated.

2. An energy absorbing device as claimed in claim 1 wherein said central anchor member is a rod adapted to absorb horizontal bending and tension forces.

3. An energy absorbing device for dissipating upon impact at least a portion of the kinetic energy of an object moving over a surface comprising in combination:
(a) a base portion adapted to be anchored in said surface,
(b) an upright container having generally cylindrical coaxial outer and inner shells,
(c) a circular cap fitted over the upper ends of said shells and having a central hub portion and radial ribs emanating therefrom for opposing axially inward collapsing of the cap and for rigidifying the same,
(d) a tension member coaxially disposed relative to said shells and connected to and extending between the central hub portion of said cap and said base portion for securing the container to said base portion, and
(e) fluid material filling the space and retained in the container between said outer and inner shells.

4. A device as claimed in claim 3 wherein said fluid material is a gas.

5. A device as claimed in claim 3 wherein said fluid material is a granular substance.

6. A device as claimed in claim 3 wherein said fluid material is a liquid.

7. A device as claimed in claim 3 wherein the fluid material is retained in the space defined within the inner shell.

8. An energy absorbing device for dissipating by deformation upon impact at least a portion of the kinetic energy of a moving vehicle traveling over a surface comprising in combination:
(a) an annular normally closed container having a vertical axis,
(b) a plurality of centrally apertured transverse members connected to and spanning the opening defined by the inner wall portion of said annular container,
(c) cap means overlying the upper surface of said container and having attachment means at its center,
(d) a vertical tension member connected at its upper end to said attachment means and projecting through the apertures of said transverse members and adapted to be connected to said surface, and
(e) fluid material filling said container for absorbing energy of impact of a moving vehicle, said material being capable of transmitting forces in all directions.

9. An energy absorbing device as claimed in claim 8 wherein said fluid material is sand.

10. An energy absorbing device for dissipating by deformation upon impact at least a portion of the kinetic energy of an object moving over a surface comprising in combination:
(a) an upright normally closed container having coaxial outer and inner deformable walls, the transverse dimension across said inner deformable wall being sufficient to permit substantial inward deformation thereof,
(b) a cap connected to the upper end of the outer deformable wall,
(c) a central anchor member connected to said cap to prevent axial displacement of the cap therefrom and extending into said surface and adapted to hold said container against said surface, and
(d) fluid material filling the container between the outer and inner deformable walls for absorbing energy of impact of a moving object, said material being capable of transmitting forces generally in all directions so that the energy absorbed thereby is most effectively dissipated.

References Cited in the file of this patent

UNITED STATES PATENTS

| | | |
|---|---|---|
| 1,903,683 | Nute | Apr. 11, 1933 |
| 2,095,609 | Long | Oct. 12, 1937 |

FOREIGN PATENTS

| | | |
|---|---|---|
| 766,944 | Great Britain | Jan. 30, 1957 |